US008564581B2

(12) United States Patent
Yamashita et al.

(10) Patent No.: US 8,564,581 B2
(45) Date of Patent: Oct. 22, 2013

(54) ORGANIC ELECTROLUMINESCENT DEVICE HAVING A LIGHT-RECEIVING SENSOR FOR DATA CORRECTION

(75) Inventors: Junichi Yamashita, Tokyo (JP); Jiro Yamada, Kanagawa (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 435 days.

(21) Appl. No.: 12/588,965

(22) Filed: Nov. 4, 2009

(65) Prior Publication Data

US 2010/0149146 A1 Jun. 17, 2010

(30) Foreign Application Priority Data

Dec. 17, 2008 (JP) ................................ 2008-320562

(51) Int. Cl.
*G06F 3/038* (2013.01)
*G09G 5/00* (2006.01)

(52) U.S. Cl.
USPC ........................................................ 345/207

(58) Field of Classification Search
USPC ........................................................ 345/207
See application file for complete search history.

(56) References Cited

U.S. PATENT DOCUMENTS

2003/0063081 A1* 4/2003 Kimura et al. ................ 345/211
2003/0227262 A1 12/2003 Kwon
2004/0046164 A1 3/2004 Kobayashi et al.
2004/0070557 A1 4/2004 Asano et al.
2004/0183759 A1* 9/2004 Stevenson et al. .............. 345/82
2005/0206590 A1 9/2005 Sasaki et al.
2006/0012311 A1* 1/2006 Ogawa ....................... 315/169.3
2006/0066537 A1* 3/2006 Kimura et al. .................. 345/76
2007/0080908 A1* 4/2007 Nathan et al. ................... 345/77
2008/0252626 A1* 10/2008 Iida et al. ...................... 345/204
2009/0033646 A1* 2/2009 Liu et al. ........................ 345/207
2009/0261259 A1* 10/2009 Yip .......................... 250/370.09

FOREIGN PATENT DOCUMENTS

JP 2003-255856 9/2003
JP 2003-271095 9/2003
JP 2004-029791 1/2004
JP 2004-093682 3/2004
JP 2004-133240 4/2004

* cited by examiner

*Primary Examiner* — Chanh Nguyen
*Assistant Examiner* — Long D Pham
(74) *Attorney, Agent, or Firm* — Rader, Fishman & Grauer PLLC

(57) ABSTRACT

A display includes: a panel in which a plurality of pixels emitting light in response to a video signal are arranged; a light-receiving sensor outputting a light-reception signal in accordance with the light-emission of each pixel; calculation means for calculating correction data on the basis of the light-receiving signal; and drive control means for correcting the video signal on the basis of the correction data, wherein the light-receiving sensor is adhered to an outermost substrate constituting the panel by using a material with a refractive index which is equal to or smaller than that of the substrate.

5 Claims, 14 Drawing Sheets

ORGANIC ELECTROLUMINESCENT DEVICE HAVING A LIGHT-RECEIVING SENSOR FOR DATA CORRECTION

BACKGROUND OF THE INVENTION

1. Field of the Invention

The present invention relates to a display, and in particular, to a display which can perform high-speed and accurate burn-in correction.

2. Description of the Related Art

In recent years, flat self-luminous panels (EL panel) which use an organic EL (Electro Luminescent) device as a light-emitting device are being actively developed. The organic EL device has a diode characteristic, and uses the phenomenon that an organic thin film emits light in response to application of an electric field thereto. The organic EL device can be driven by application voltage of 10 V or lower, and thus it has low power consumption. Further, the organic EL device is a self-luminous device which emits light by itself. Therefore, an illumination member does not need to be provided, so reduction in weight and thickness can be easily achieved. Further, the response speed of the organic EL device is as very high as about several μS, which causes no residual image in the EL panel when a motion image is displayed.

Among flat self-luminous panels using an organic EL device in pixels, an active matrix-type panel in which a thin film transistor is integrally formed as a drive device in each pixel is being actively developed. An active matrix-type flat self-luminous panel is described, for example, in JP-A-2003-255856, JP-A-2003-271095, JP-A-2004-133240, JP-A-2004-029791, and JP-A-2004-093682.

SUMMARY OF THE INVENTION

In the organic EL device, the luminance efficiency is degraded in proportion to the light-emission amount and the light-emission time. The light-emission luminance of the organic EL device is represented by the product of the current value and the luminance efficiency, so the degradation in the luminance efficiency causes a decrease in the light-emission luminance. In general, as video to be displayed on the screen, there is hardly any video, which is displayed uniformly over the pixels, and the light-emission amount differs between the pixels. Accordingly, the degree of degradation in the light-emission luminance differs between pixels due to the difference in the past light-emission amount and light-emission time even under the same drive condition, which causes a phenomenon that a variation in the degradation in luminance is visually recognized. The phenomenon that the variation in the degradation in luminance is visually recognized is called a burn-in phenomenon.

In the EL panel, in order to prevent the burn-in phenomenon, the light-emission luminance of each pixel is measured, and burn-in correction is performed so as to correct degradation in the light-emission luminance. With the burn-in correction according to the related art, however, correction may not be sufficiently performed.

Thus, it is desirable to enable high-speed and accurate burn-in correction.

A display according to an embodiment of the invention includes a panel having arranged a plurality of pixels emitting light in response to a video signal, a light-receiving sensor outputting a light-reception signal in accordance with the light-emission of each pixel, a calculation means for calculating correction data on the basis of the light-reception signal, and a drive control means for correcting the video signal on the basis of correction data. The light-receiving sensor is adhered to an outermost substrate constituting the panel by using a material with a refractive index which is equal to or smaller than that of the substrate.

According to the embodiment of the invention, the light-receiving sensor is adhered to the outermost substrate constituting the panel by using a material with a refractive index which is equal to or smaller than that of the substrate. Thus, the light-emission luminance of each of a plurality of pixels arranged in a matrix is measured, correction data for degradation in luminance due to time-dependent deterioration is calculated by using the measured light-emission luminance, and the degradation in luminance is corrected on the basis of the correction data.

According to the embodiment of the invention, high-speed and accurate burn-in correction can be performed.

DESCRIPTION OF PREFERRED EMBODIMENTS

Embodiment of the Invention

[Configuration of Display]

Figure 1:
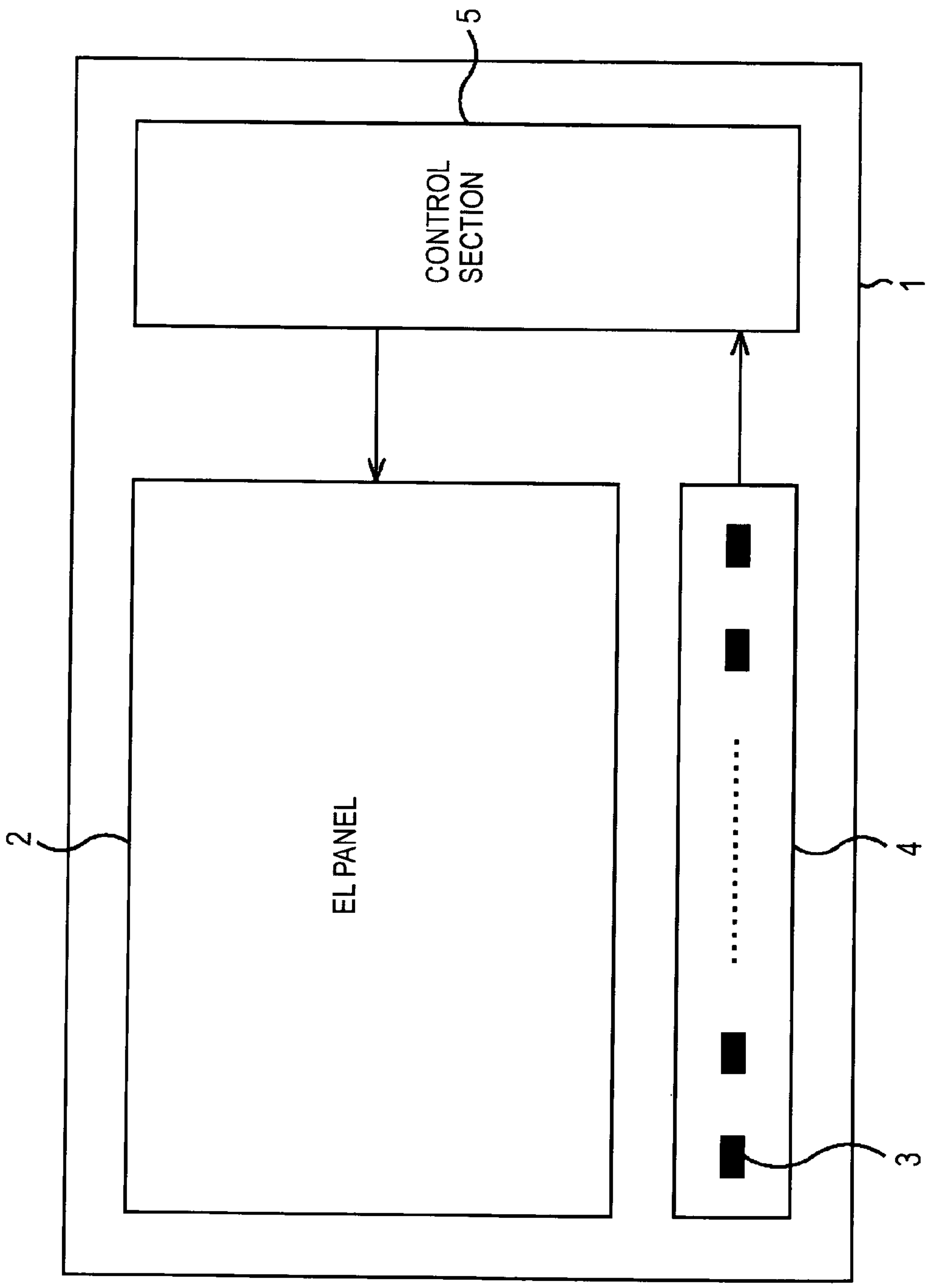
FIG. 1 is a block diagram showing an example of the configuration of a display according to an embodiment of the invention.

FIG. 1 is a block diagram showing an example of the configuration of a display according to an embodiment of the invention.

A display 1 of FIG. 1 includes an EL panel 2, a sensor section 4 having a plurality of light-receiving sensors 3, and a control section 5. The EL panel 2 uses an organic EL (Electro Luminescent) device as a self-luminous device. The light-receiving sensors 3 are sensors which measure the light-emission luminance of the EL panel 2. The control section 5 controls display of the EL panel 2 on the basis of the light-emission luminance of the EL panel 2 obtained from the light-receiving sensors 3.

[Configuration of EL Panel]

Figure 2:
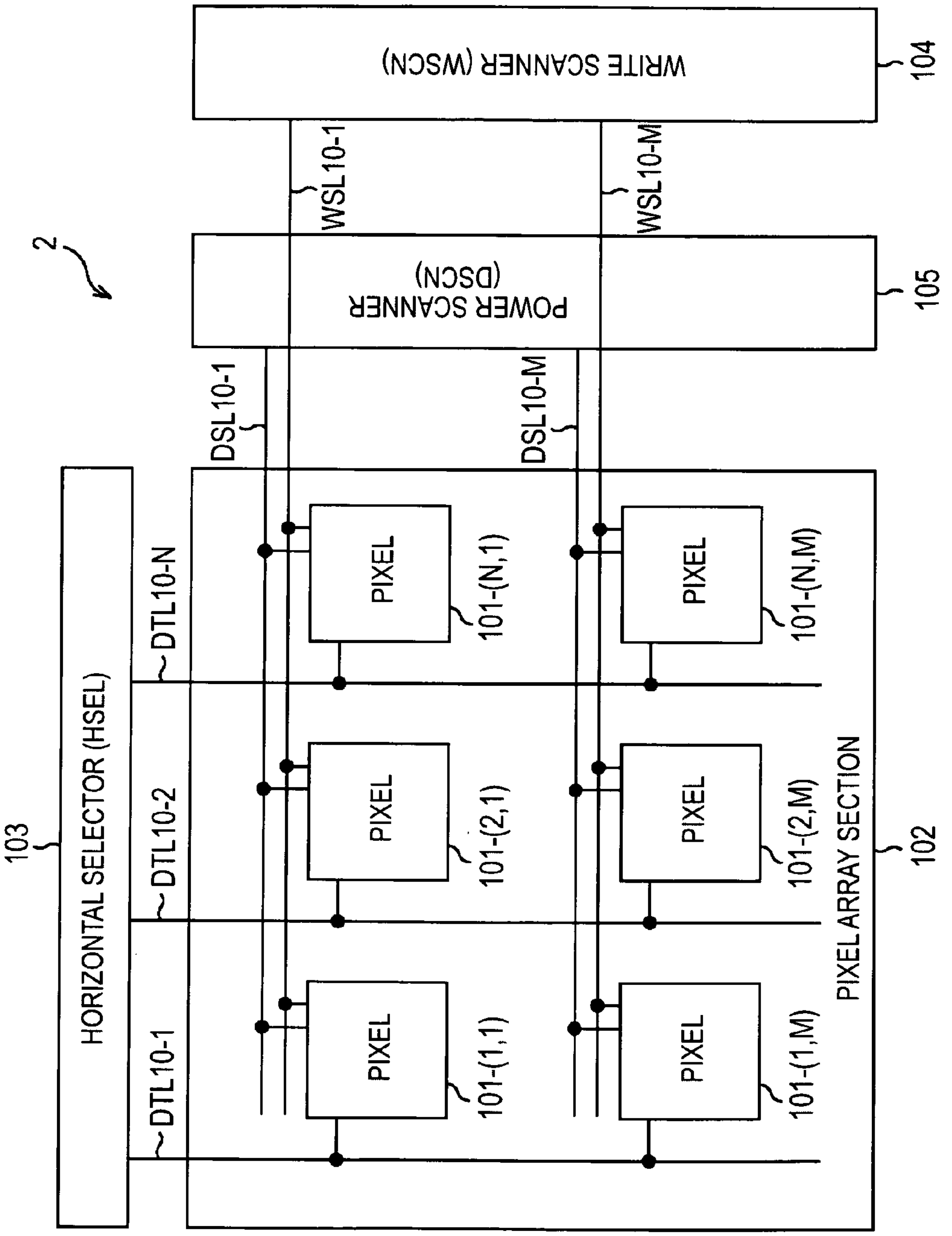
FIG. 2 is a block diagram showing an example of the configuration of an EL panel.

FIG. 2 is a block diagram showing an example of the configuration of the EL panel 2.

The EL panel 2 includes a pixel array section 102, a horizontal selector (HSEL) 103, a write scanner (WSCN) 104, and a power scanner (DSCN) 105. The pixel array section 102 has N×M (where N and M are independent integers of 1 or more) pixels (pixel circuit) 101-(1,1) to 101-(N,M) arranged in a matrix. The horizontal selector (HSEL) 103, the write scanner (WSCN) 104, and the power scanner (DSCN) 105 operate as a drive section which drives the pixel array section 102.

The EL panel 2 also has M scanning lines WSL10-1 to WSL10-M, M power supply lines DSL10-1 to DSL10-M, and N video signal lines DTL10-1 to DTL10-N.

In the following description, the scanning lines WSL10-1 to WSL10-M will be simply called the scanning line(s) WSL10 in the case where it is not specifically necessary to distinguish between the scanning lines WSL10-1 to WSL10-M. Further, the video signal lines DTL10-1 to DTL10-N will be called the video signal line(s) DTL10 in the case where it is not specifically necessary to distinguish between the video signal lines DTL10-1 to DTL10-N. Similarly, the pixels 101-(1,1) to 101-(N,M) and the power supply lines DSL10-1 to 10-M will be respectively called the pixel (s) 101 and the power supply line (s) DSL10.

Among the pixels 101-(1,1) to 101-(N,M), the pixels 101-(1,1) to 101-(N,1) in the first row are connected to the write scanner 104 through the scanning line WSL10-1, and to the power scanner 105 through the power supply line DSL10-1. Among the pixels 101-(1,1) to 101-(N,M), the pixels 101-(1, M) to 101-(N,M) in the M-th row are connected to the write scanner 104 through the scanning line WSL10-M and to the power scanner 105 through the power supply line DSL10-M. The same is applied to other pixels 101 arranged in rows among the pixels 101-(1,1) to 101-(N,M).

Among the pixels 101-(1,1) to 101-(N,M), the pixels 101-(1,1) to 101-(1,M) in the first column are connected to the horizontal selector 103 through the video signal line DTL10-1. Among the pixels 101-(1,1) to 101-(N,M), the pixels 101-(N, 1) to 101-(N,M) in the N-th column are connected to the horizontal selector 103 through the video signal line DTL10-N. The same is applied to other pixels 101 arranged in columns among the pixels 101-(1,1) to 101-(N,M).

The write scanner 104 sequentially supplies a control signal to the scanning lines WSL10-1 to WSL10-M during a horizontal period (1H) so as to line-sequentially scan the pixels 101 in terms of rows. The power scanner 105 supplies a power supply voltage, a first potential (Vcc described below) or a second potential (Vss described below), to the power supply lines DSL10-1 to DSL10-M in matching with line-sequential scanning. The horizontal selector 103 selectively supplies a signal potential Vsig corresponding to the video signal and a reference signal Vofs to the video signal lines DTL10-1 to DTL10-M arranged in columns during each horizontal period (1H) in matching with line-sequential scanning.

[Arrangement of Pixel 101]

Figure 3:
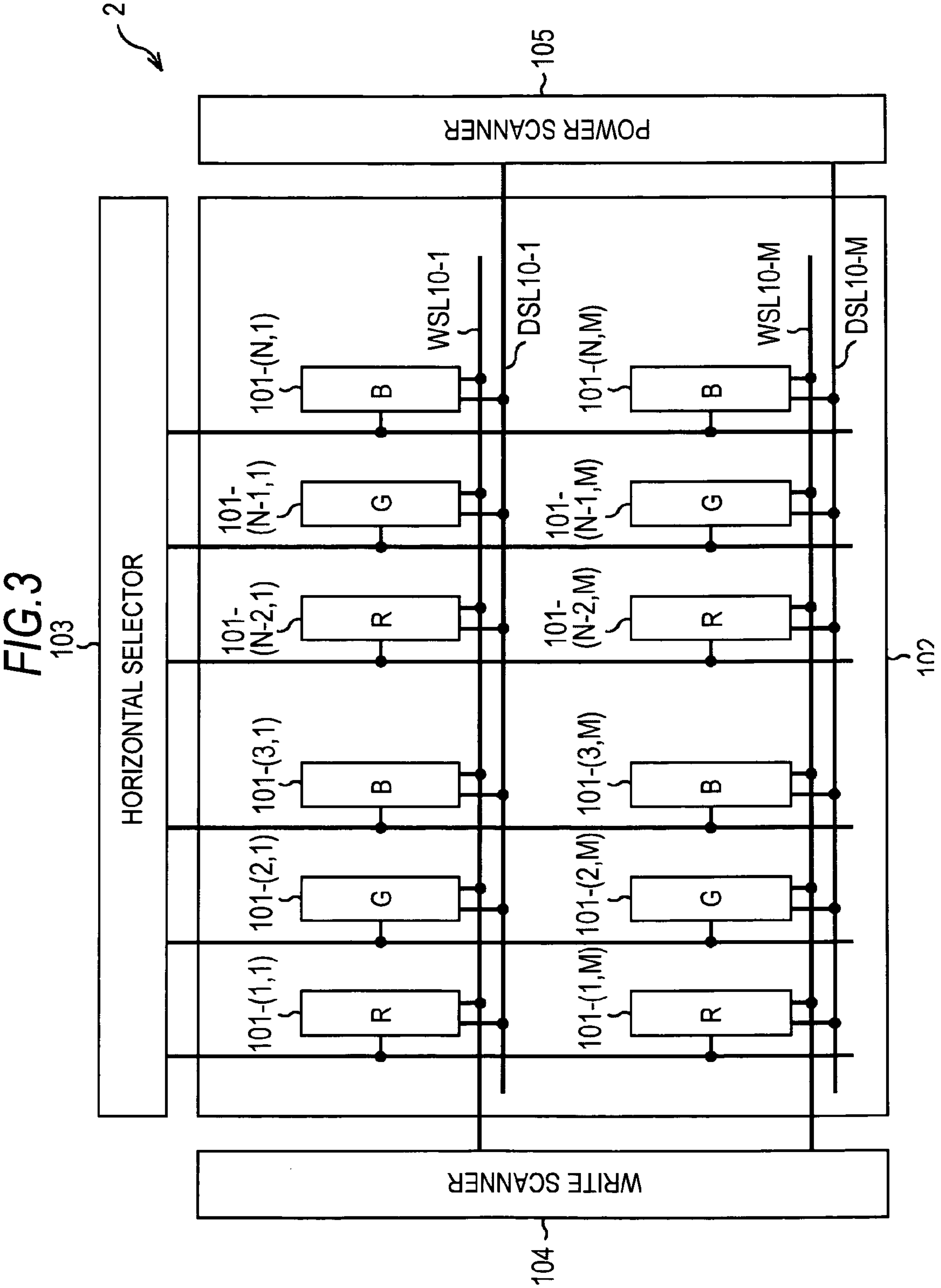
FIG. 3 is a diagram showing the arrangement of colors emitted from pixels.

FIG. 3 shows the arrangement of colors emitted from the respective pixels 101 of the EL panel 2.

Each pixel 101 of the pixel array section 102 corresponds to a so-called subpixel which emits light of one color of red (R), greed (G), and blue (B). Three pixels 101 of red, green, and blue arranged in the row direction (the left-right direction in the drawing) form one pixel for display.

The arrangement shown in FIG. 3 is different from FIG. 2 in that the write scanner 104 is disposed on the left side of the pixel array section 102, and the scanning line WSL10 and the power supply line DSL10 are connected to the pixel 101 from below. The horizontal selector 103, the write scanner 104, the power scanner 105, and the lines connected to the respective pixels 101 may be appropriately disposed as occasion demands.

[Detailed Circuit Configuration of Pixel 101]

Figure 4:
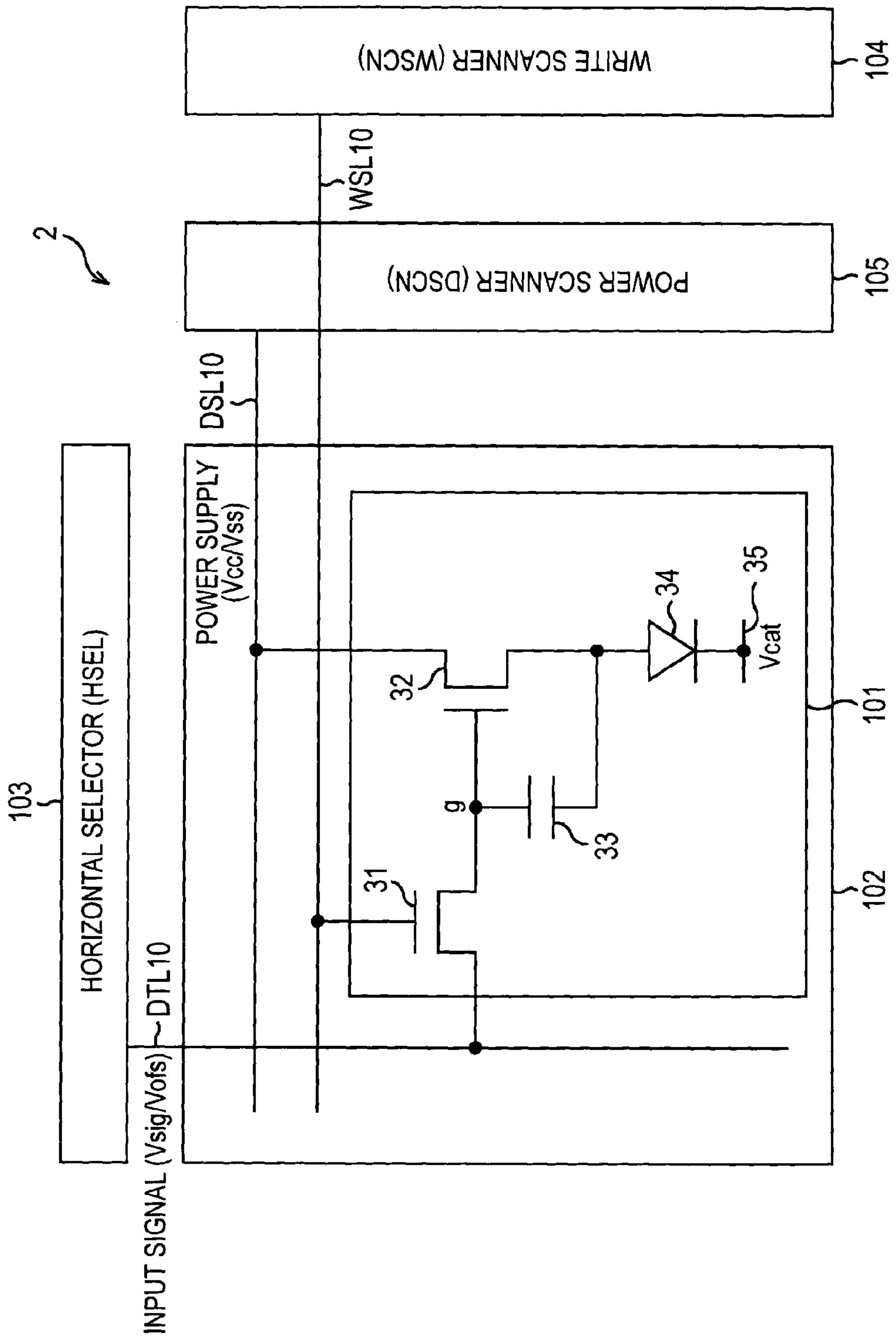
FIG. 4 is a block diagram showing the detailed circuit configuration of a pixel.

FIG. 4 is a block diagram showing the detailed circuit configuration of the pixel 101, in which one pixel 101 among the N×M pixels 101 of the EL panel 2 is enlarged.

Referring to FIG. 2, the scanning line WSL10, the video signal line DTL10, and the power supply line DSL10 connected to the pixel 101 in FIG. 4 are as follows. That is, the scanning line WSL10-(*n,m*), the video signal line DTL10-(*n, m*), and the power supply line DSL10-(*n,m*) in FIG. 4 correspond to the pixel 101-(*n,m*) (where n=1, 2, . . . , N, and m=1, 2, . . . , M) in FIG. 2.

Referring to FIG. 4, the pixel 101 has a sampling transistor 31, a drive transistor 32, a storage capacitor 33, and a light-emitting device 34. The sampling transistor 31 has a gate connected to the scanning line WSL10, a drain connected to the video signal line DTL10, and a source connected to the gate g of the drive transistor 32.

The drive transistor 32 has one of a source and a drain connected to the anode of the light-emitting device 34, and the other connected to the power supply line DSL10. The storage capacitor 33 is connected to the gate g of the drive transistor and the anode of the light-emitting device 34. The light-emitting device 34 has a cathode connected to a line 35 which is set at a predetermined potential Vcat. The potential Vcat is a GND level, thus the line 35 is a ground line.

The sampling transistor 31 and the drive transistor 32 are both N-channel transistors. For this reason, the sampling transistor 31 and the drive transistor 32 can be formed by amorphous silicon which is cheaper than low-temperature polysilicon. Therefore, the pixel circuit can be manufactured at low cost. Of course, the sampling transistor 31 and the drive transistor 32 may be formed by low-temperature polysilicon or single-crystal silicon.

The light-emitting device 34 is an organic EL device. The organic EL device is a current light-emitting device having a diode characteristic. Therefore, the light-emitting device 34 emits light with gradation according to a current value Ids supplied thereto.

In the pixel 101 configured as above, the sampling transistor 31 is turned on (conducts) in response to a control signal from the scanning line WSL10, and samples the video signal at the signal potential Vsig according to gradation through the video signal line DTL10. The storage capacitor 33 accumulates and holds the electric charges supplied from the horizontal selector 103 through the video signal line DTL10. The drive transistor 32 is supplied with a current from the power supply line DSL10 at the first potential Vcc, and causes a drive current Ids to flow in the light-emitting device 34 (supplies the drive current Ids to the light-emitting device 34) in accordance with the signal potential Vsig held in the storage capacitor 33. The predetermined drive current Ids flowing in the light-emitting device 34 causes the pixel 101 to emit light.

The pixel 101 has a threshold value correction function. The threshold value correction function allows a voltage corresponding to the threshold voltage Vth of the drive transistor 32 to be held in the storage capacitor 33. The threshold value correction function makes it possible to cancel out the influence of the threshold voltage Vth of the drive transistor 32 which causes a variation between the pixels of the EL panel 2.

The pixel 101 has a mobility correction function in addition to the threshold value correction function. The mobility correction function applies correction on the mobility μ of the drive transistor 32 to the signal potential Vsig when the signal potential Vsig is held in the storage capacitor 33.

The pixel 101 also has a bootstrap function. The bootstrap function allows a gate potential Vg to follow a change in a source potential Vs of the drive transistor 32. The bootstrap function makes it possible to keep the gate-source voltage Vgs of the drive transistor 32 constant.

[Description of Operation of Pixel 101]

Figure 5:
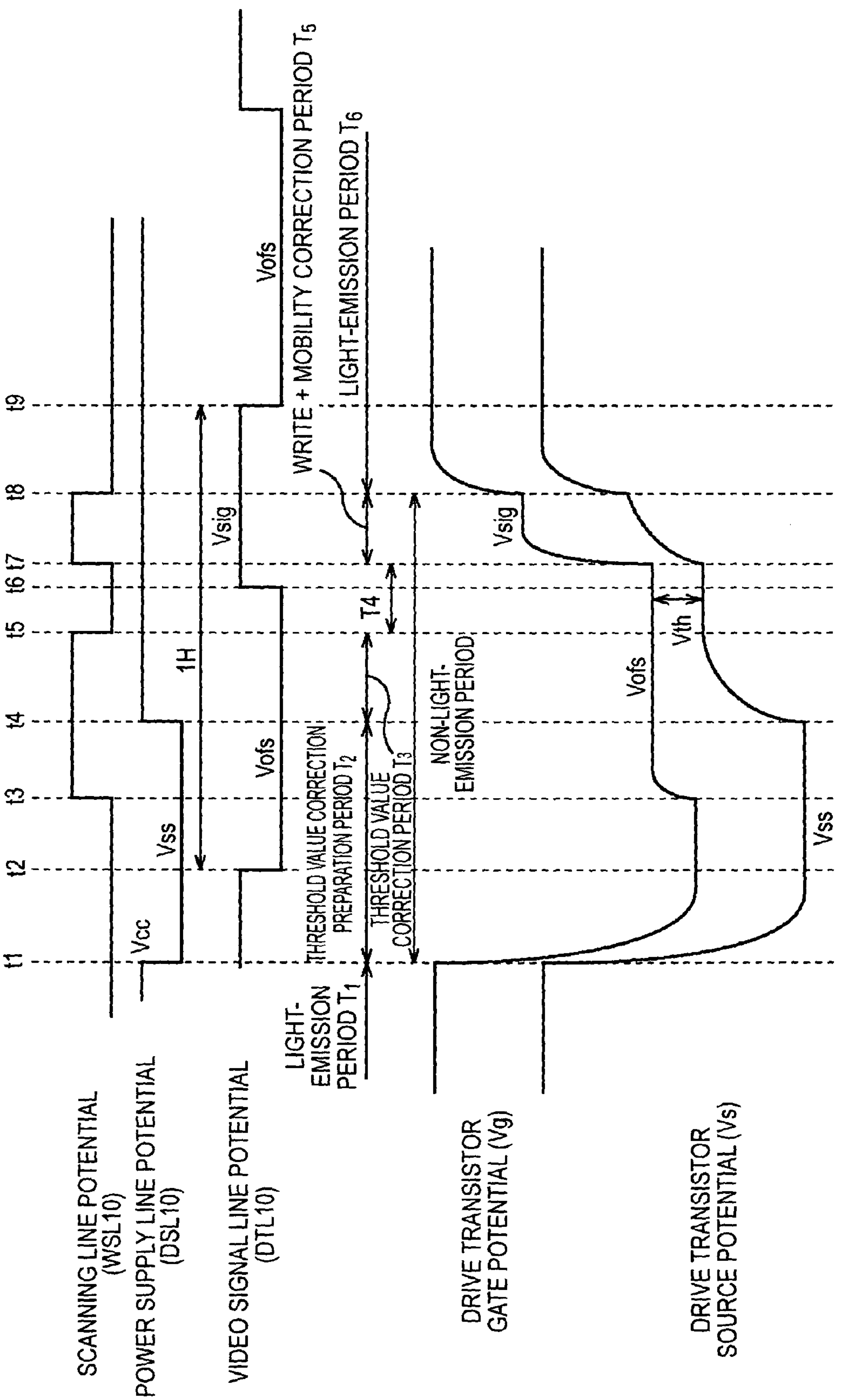
FIG. 5 is a timing chart illustrating the operation of a pixel.

FIG. 5 is a timing chart illustrating the operation of the pixel 101.

FIG. 5 shows changes in potential of the scanning line WSL10, the power supply line DSL10, and the video signal line DTL10 on the same time axis (in the horizontal direction of the drawing), and corresponding changes in the gate potential Vg and the source potential Vs of the drive transistor 32.

In FIG. 5, the period until the time $t_1$ is a light-emission period $T_1$ in which light-emission of the previous horizontal period (1H) is made.

The period from the time $t_1$, at which the light-emission period $T_1$ has ended, to the time $t_4$ is a threshold value correction preparation period $T_2$ in which the gate potential Vg and the source potential Vs of the drive transistor 32 are initialized so as to prepare for a threshold value correction operation.

During the threshold value correction preparation period $T_2$, at the time $t_1$, the power scanner 105 changes the potential of the power supply line DSL10 from the high potential, the first potential Vcc, to the low potential, the second potential Vss. At the time $t_2$, the horizontal selector 103 changes the potential of the video signal line DTL10 from the signal potential Vsig to the reference potential Vofs. At the time $t_3$, the write scanner 104 changes the potential of the scanning line WSL10 to the high potential so as to turn on the sampling transistor 31. Therefore, the gate potential Vg of the drive transistor 32 is reset at the reference potential Vofs, and the source potential Vs is reset at the second potential Vss of the video signal line DTL10.

The period from the time $t_4$ to the time $t_5$ is a threshold value correction period $T_3$ in which the threshold value correction operation is carried out. During the threshold value correction period $T_3$, at the time $t_4$, the power scanner 105 changes the potential of the power supply line DSL10 to the high potential Vcc, and a voltage corresponding to the threshold voltage Vth is written to the storage capacitor 33 connected between the gate and the source of the drive transistor 32.

During a write+mobility correction preparation period $T_4$ from the time $t_5$ to the time $t_7$, the potential of the scanning line WSL10 is changed once from the high potential to the low potential. At the time $t_6$ before the time $t_7$, the horizontal selector 103 changes the potential of the video signal line DTL10 from the reference potential Vofs to the signal potential Vsig according to gradation.

During a write+mobility correction period $T_5$ from the time $t_7$ to the time $t_8$, a video signal write operation and a mobility correction operation are carried out. That is, during the period from the time $t_7$ to the time $t_8$, the potential of the scanning line WSL10 is set at the high potential, thus the signal potential Vsig corresponding to the video signal is added to the threshold voltage Vth and written to the storage capacitor 33. Further, a voltage $\Delta V_\mu$ for mobility correction is subtracted from the voltage held in the storage capacitor 33.

At the time $t_8$ after the write+mobility correction period $T_5$ has ended, the potential of the scanning line WSL10 is set at the low potential. Thereafter, during a light-emission period $T_6$, the light-emitting device 34 emits light with light-emission luminance according to the signal voltage Vsig. The signal voltage Vsig is adjusted by the voltage corresponding to the threshold voltage Vth and the voltage $\Delta V_\mu$ for mobility correction, so the light-emission luminance of the light-emitting device 34 is not influenced by a variation in the threshold voltage Vth or the mobility μ of the drive transistor 32.

At the beginning of the light-emission period $T_6$, the bootstrap operation is carried out, the gate potential Vg and the source voltage Vs of the drive transistor 32 rise while the gate-source voltage $Vgs=Vsig+Vth-\Delta V_\mu$ of the drive transistor 32 is kept constant.

At the time $t_9$ when a predetermined time has elapsed from the time $t_8$, the potential of the video signal line DTL10 falls from the signal potential Vsig to the reference potential Vofs. In FIG. 5, the period from the time $t_2$ to the time $t_9$ corresponds to the horizontal period (1H).

In this way, in each pixel 101 of the EL panel 2, the light-emitting device 34 can emit light without being influenced by the variation in the threshold voltage Vth or the mobility μ of the drive transistor 32.

[Description of Another Example of Operation of Pixel 101]

Figure 6:
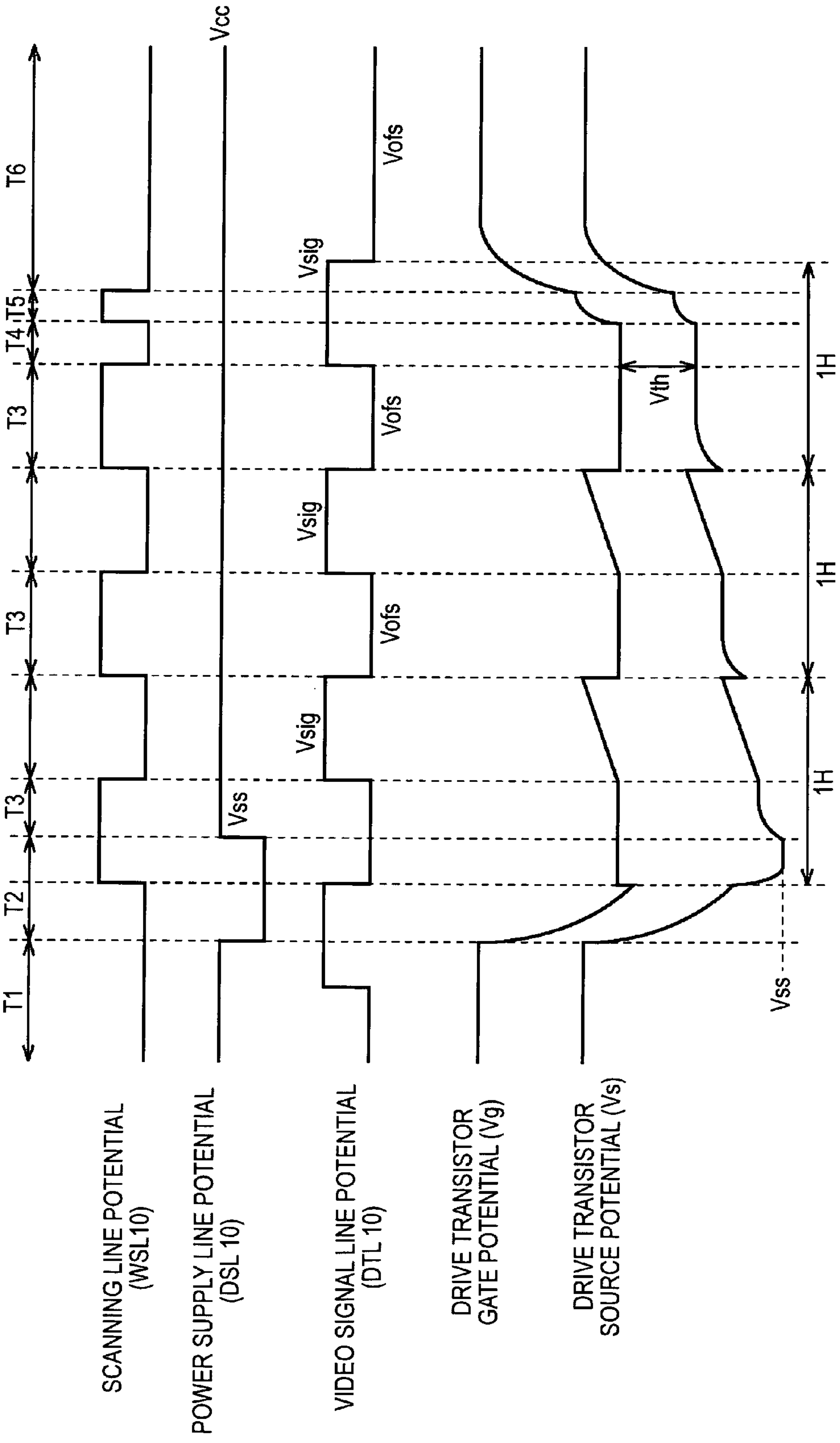
FIG. 6 is a timing chart illustrating another example of the operation of a pixel.

FIG. 6 is a timing chart illustrating another example of the operation of the pixel 101.

In the example of FIG. 5, the threshold value correction operation is carried out once during one 1H period. Meanwhile, there is a case where the 1H period is short, and the threshold value correction operation is unlikely to be carried out during the 1H period. In such a case, the threshold value correction operation may be carried out multiple times over a plurality of 1H periods.

In the example of FIG. 6, the threshold value correction operation is carried out over successive 3H periods. That is, in the example of FIG. 6, the threshold value correction period $T_3$ is divided into three sections. The other operations of the pixel 101 are the same as those in the example of FIG. 5, and thus descriptions thereof will be omitted.

[Functional Block Diagram of Burn-in Correction Operation]

In the organic EL device, the light-emission luminance is degraded in proportion to the light-emission amount and light-emission time. In general, as an image to be displayed on the EL panel 2, there is hardly any image, which is displayed uniformly over the pixels 101, and the light-emission amount differs between the pixels 101. Thus, if a predetermined time has elapsed, the difference in the degree of degradation in the luminance efficiency between the pixels 101 becomes conspicuous in accordance with the previous light-emission amount and light-emission time. For this reason, under the same drive condition, the user recognizes the phenomenon (hereinafter, called burn-in phenomenon) that the light-emission luminance differs, as if burn-in has occurred. Therefore, the display 1 performs burn-in correction control so as to correct the burn-in phenomenon due to the difference in the degree of degradation in luminance efficiency.

Figure 7:
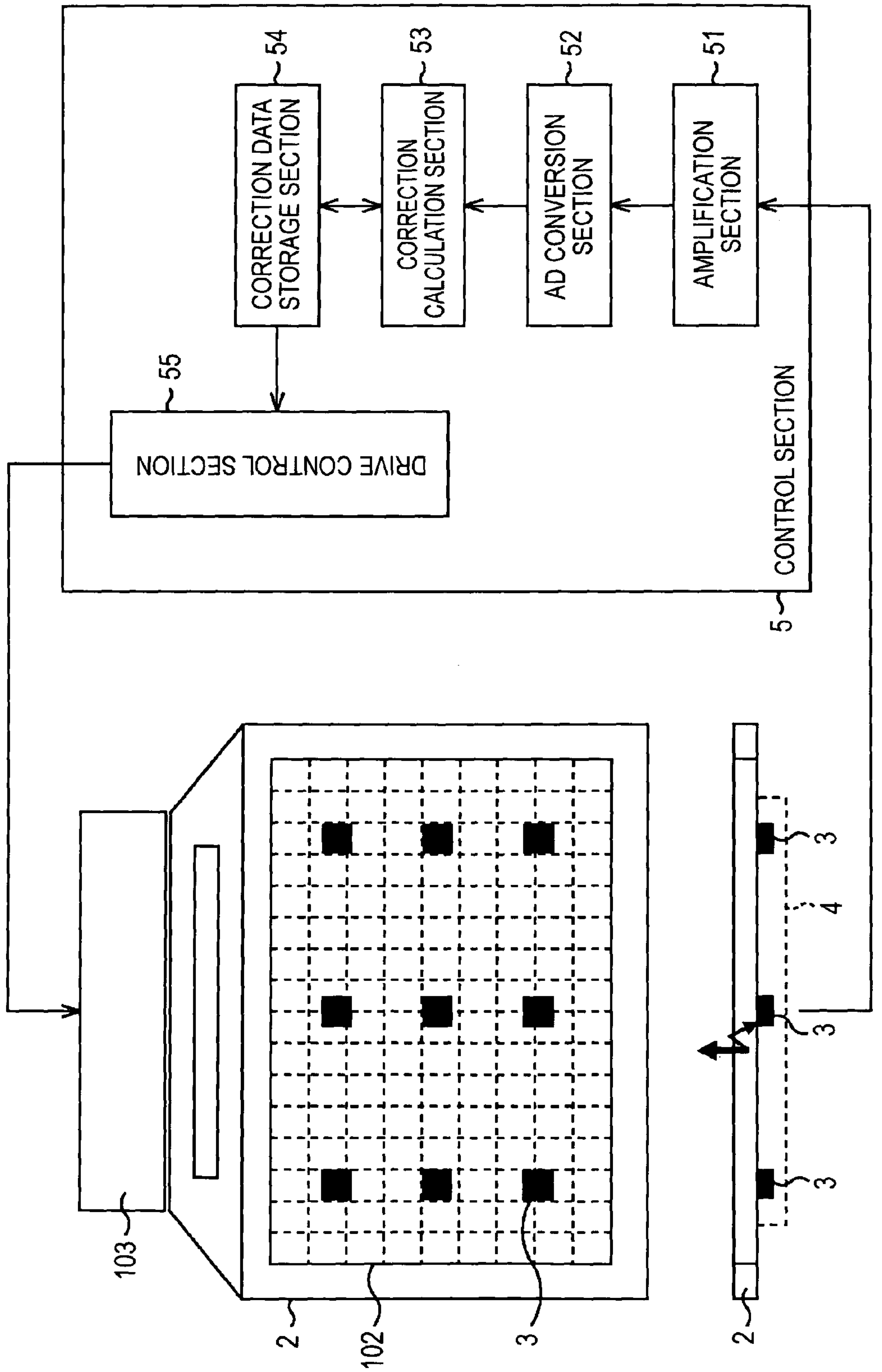
FIG. 7 is a functional block diagram of a display related to burn-in correction control.

FIG. 7 shows a functional block diagram showing an example of the functional configuration of the display 1 for executing burn-in correction control.

The light-receiving sensors 3 are attached to the rear surface (the surface opposite to the display surface facing the user) of the EL panel 2 so as not to interfere with the light emission of the respective pixels 101. The light-receiving sensors 3 are disposed uniformly one by one in a predetermined region. FIG. 7 conceptually shows the arrangement of the light-receiving sensors 3 in the display 1. The number of pixels of the EL panel 2 and the number of light-receiving sensor 3 disposed on the rear surface of the EL panel 2 are not limited thereto. Each light-receiving sensor 3 measures the light-emission luminance of the respective pixels 101 in the region which it covers. Specifically, the light-receiving sensor 3 receives light reflected by the front glass substrate or the like of the EL panel 2 and input thereto when the pixels 101 in the region which it covers sequentially emit light, and supplies an analog light-reception signal (voltage signal) according to light-reception luminance to the control section 5.

The control section 5 includes an amplification section 51, an AD conversion section 52, a correction calculation section 53, a correction data storage section 54, and a drive control section 55.

The amplification section 51 amplifies the analog light-reception signal supplied from each light-receiving sensor 3 and supplies the amplified analog light-reception signal to the AD conversion section 52. The AD conversion section 52 converts the amplified analog light-reception signal supplied from the amplification section 51 into a digital signal (luminance data), and supplies the digital signal to the correction calculation section 53.

The correction calculation section 53 compares luminance data in the initial state (at the time of shipment) with luminance data after a predetermined time has elapsed (after time-dependent deterioration) for each pixel 101 of the pixel array section 102 so as to calculate the amount of degradation in luminance of each pixel 101. The correction calculation section 53 calculates correction data for correcting the degradation in luminance on the basis of the calculated amount of degradation in luminance for each pixel 101. The calculated correction data for each pixel 101 is supplied to the correction data storage section 54. The correction calculation section 53 may be formed by a signal processing IC, such as an FPGA (Field Programmable Gate Array), an ASIC (Application Specific Integrated Circuit), or the like.

The correction data storage section 54 stores the correction data for each pixel 101 calculated by the correction calculation section 53. The correction data storage section 54 also stores the luminance data in the initial state of each pixel 101 used in the correction calculation.

The drive control section 55 performs controls so as to correct the degradation in luminance due to time-dependent deterioration of each pixel 101 on the basis of the correction data. Specifically, the drive control section 55 controls the horizontal selector 103 so as to supply to each pixel 101 the signal potential Vsig which corresponds to the video signal input to the display 1 with the degradation in luminance due to time-dependent deterioration having been corrected by the correction data.

[Initial Data Acquisition Processing of Pixel 101]

Figure 8:
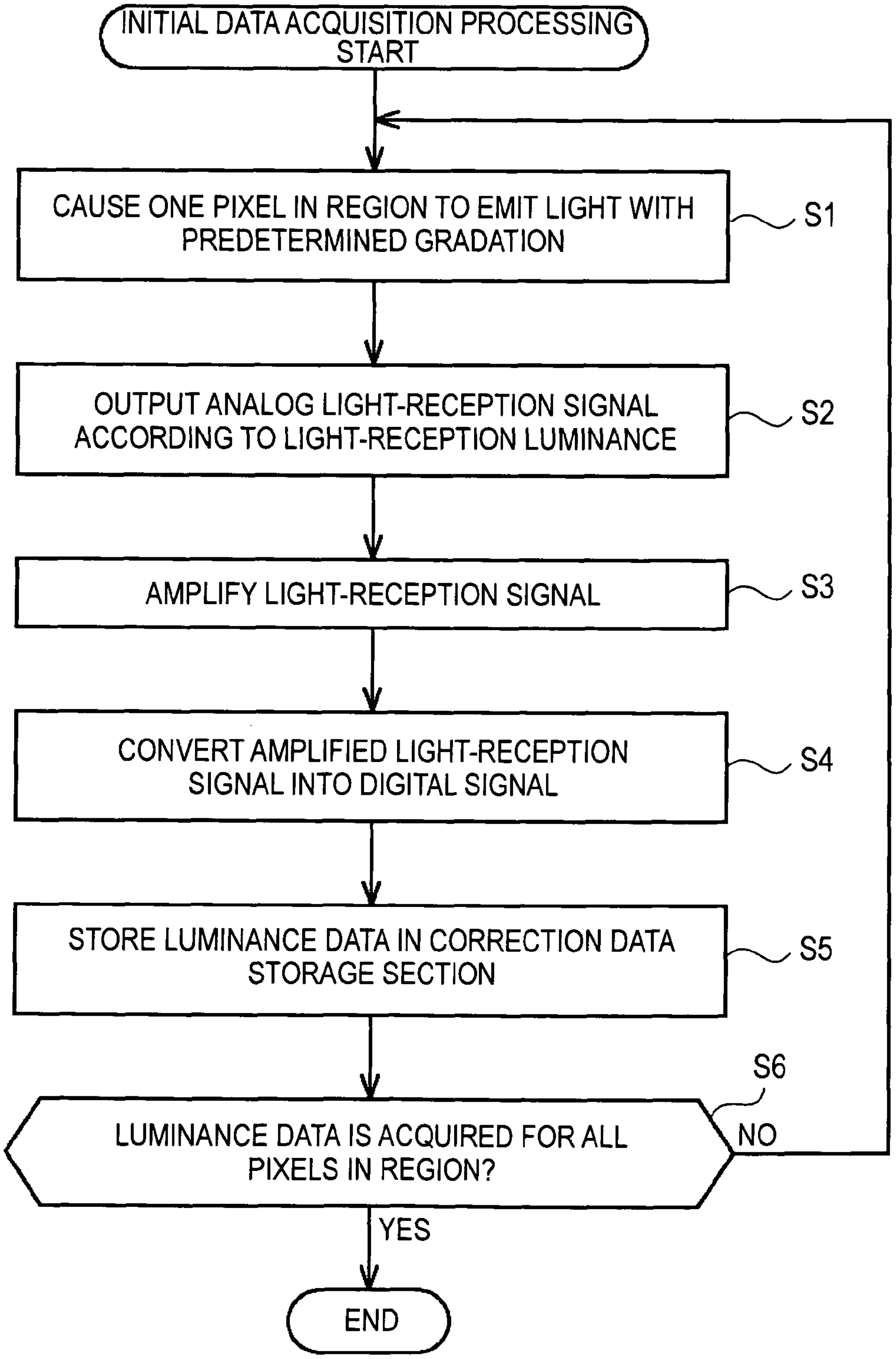
FIG. 8 is a flowchart illustrating an example of initial data acquisition processing.

Next, the initial data acquisition processing for acquiring luminance data in the initial state of each pixel 101 of the pixel array section 102 will be described with reference to a flowchart of FIG. 8. The processing of FIG. 8 is performed in parallel in the respective regions which are divided to correspond to the light-receiving sensors 3.

In Step S1, the drive control section 55 first causes one pixel 101 in a region where luminance data in the initial state is not acquired to emit light with predetermined gradation (brightness) set in advance. In Step S2, the light-receiving sensor 3 outputs an analog light-reception signal (voltage signal) according to the light-reception luminance to the amplification section 51 of the control section 5.

In Step S3, the amplification section 51 amplifies the light-reception signal supplied from the light-receiving sensor 3, and supplies the amplified light-reception signal to the AD conversion section 52. In Step S4, the AD conversion section 52 converts the amplified analog light-reception signal into a digital signal (luminance data), and supplies the digital signal to the correction calculation section 53. In Step S5, the correction calculation section 53 supplies luminance data supplied thereto to the correction data storage section 54, and stores luminance data in the correction data storage section 54.

In Step S6, the drive control section 55 determines whether or not luminance data in the initial state is acquired for all of the pixels 101 in the region. When it is determined in Step S6 that luminance data in the initial state has not yet been acquired for all of the pixels 101 in the region, the processing returns to Step S1, and Steps S1 to S6 are repeated. That is, one pixel 101 in the region where luminance data in the initial state has not yet been acquired emits light with predetermined gradation, and luminance data is acquired.

When it is determined in Step S6 that luminance data in the initial state is acquired for all of the pixels 101 in the region, the processing ends.

[Correction Data Acquisition Processing of Pixel 101]

Figure 9:
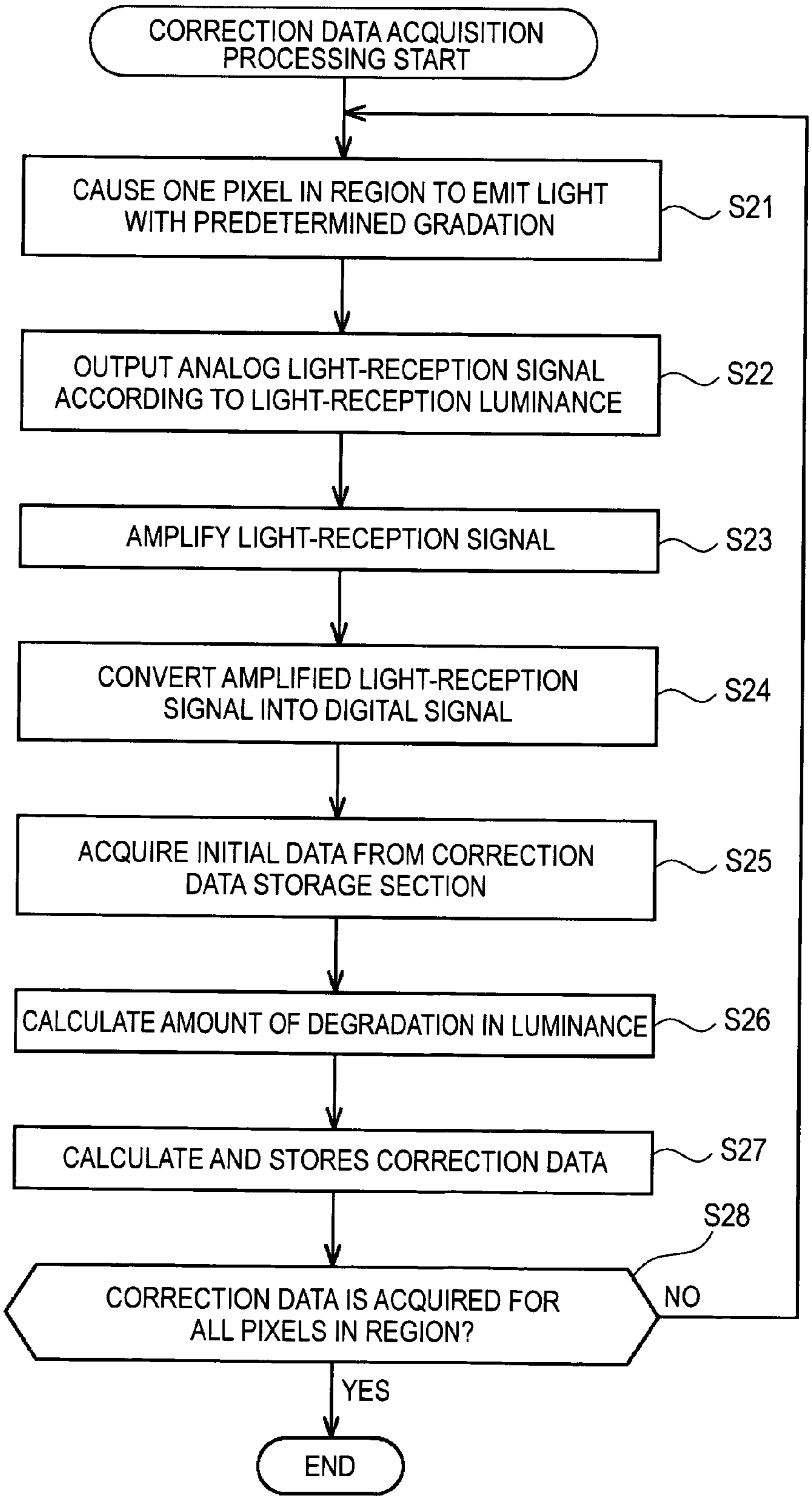
FIG. 9 is a flowchart illustrating an example of correction data acquisition processing.

FIG. 9 is a flowchart of correction data acquisition processing which is performed when a predetermined time has elapsed after the processing of FIG. 8. This processing is performed in parallel in the respective regions which are divided to correspond to the light-receiving sensors 3, similarly to the processing of FIG. 8.

Steps S21 to S24 are the same as Steps S1 to S4 of FIG. 8, and the descriptions thereof will be omitted. That is, in Steps S21 to S24, luminance data of the pixel 101 is acquired under the same condition as in the initial data acquisition processing.

In Step S25, the correction calculation section 53 acquires from the correction data storage section 54 luminance data (initial data) of the same pixel 101 as that when the initial data acquisition processing was performed.

In Step S26, the correction calculation section 53 compares luminance data in the initial state with luminance data acquired in Steps S21 to S24 so as to calculate the amount of degradation in luminance of the pixel 101. In Step S27, the correction calculation section 53 calculates correction data on the basis of the calculated amount of degradation in luminance, and stores the correction data in the correction data storage section 54.

In Step S28, the drive control section 55 determines whether or not correction data is acquired for all of the pixels 101 in the region. When it is determined in Step S28 that correction data has not yet been acquired for all of the pixels 101 in the region, the processing returns to Step S21, and Steps S21 to S28 are repeated. That is, luminance data is acquired for one pixel 101 in the region where correction data has not yet been acquired, and correction data is calculated.

When it is determined in Step S28 that correction data has been acquired for all of the pixels 101 in the region, the processing ends.

With the processing described with reference to FIGS. 8 and 9, the correction data for the respective pixels 101 of the pixel array section 102 is stored in the correction data storage section 54.

After correction data has been acquired, the signal potential Vsig, which corresponds to the video signal with the degradation in luminance due to time-dependent deterioration having been corrected by correction data, is supplied to the respective pixels 101 of the pixel array section 102 under the control of the drive control section 55. That is, the drive control section 55 controls the horizontal selector 103 so as to supply the signal potential Vsig, which is obtained by adding a potential according to the correction data to the signal potential corresponding to the video signal input to the display 1, to the pixels 101.

Correction data stored in the correction data storage section 54 may be a value which is obtained by multiplying the signal potential corresponding to the video signal input to the display 1 by a predetermined ratio, or may be a value which offsets a predetermined voltage value. Further, correction data may be stored as a correction table based on to the signal potential, which corresponds to the video signal input to the display 1. That is, correction data stored in the correction data storage section 54 may have any format.

Next, the relationship between the distance from the pixel 101 for light-emission luminance measurement to the light-receiving sensor 3 and the burn-in correction accuracy will be described.

[Relationship between Distance to Light-Receiving Sensor 3 and Sensor Output Voltage]

Figure 10B:
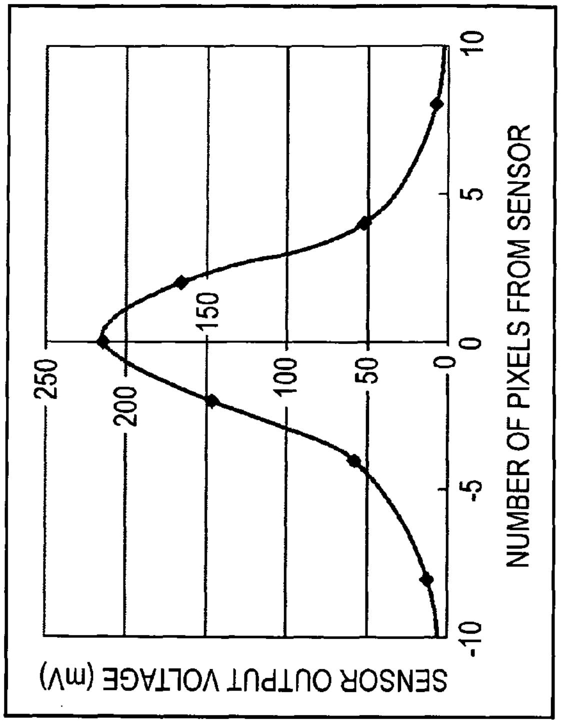
FIGS. 10A and 10B are diagrams showing the relationship between a distance to a light-receiving sensor and a sensor output voltage.
Figure 10A:
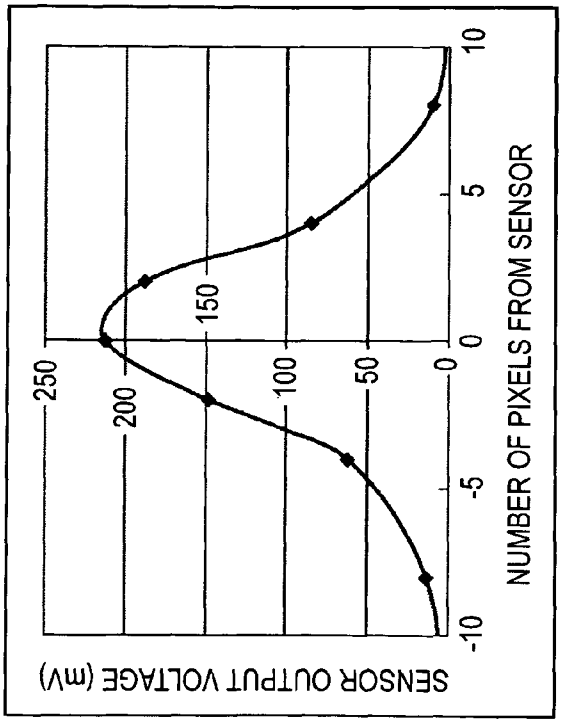

FIGS. 10A and 10B are diagrams showing the relationship between the distance from the measurement-target pixel 101 to the light-receiving sensor 3 and a voltage (sensor output voltage) corresponding to the light-reception luminance of the light-receiving sensor 3 when no particular measures have been applied. In FIGS. 10A and 10B, it is assumed that the measurement-target pixel 101 emits light with the same light-emission luminance, regardless of the distance from the pixel 101 to the light-receiving sensor 3.

In FIG. 10A, the horizontal axis represents the distance (the unit is the number of pixels) in the horizontal direction from the light-receiving sensor 3 to the measurement-target pixel 101, and the vertical axis represents a voltage (mV) which is output from the light-receiving sensor 3. In FIG. 10B, the horizontal axis represents the distance (the unit is the number of pixels) in the vertical direction from the light-receiving sensor 3 to the measurement-target pixel 101, and the vertical axis represents a voltage (mV) which is output from the light-receiving sensor 3.

If the light-emission luminance of the pixel 101 is identical, when the distance between the pixel 101 and the light-receiving sensor 3 increases, the voltage output from the light-receiving sensor 3 tends to decrease, as shown in FIGS. 10A and 10B. In other words, the distance to the light-receiving sensor 3 and the sensor output voltage have the relationship that the sensor output voltage is in reverse proportion to the distance to the light-receiving sensor 3.

[Relationship between Sensor Output Voltage of Light-Receiving Sensor 3 and Correction Accuracy]

In the burn-in correction control, the light-reception signal of the light-receiving sensor 3 having such a characteristic is amplified at the same predetermined amplification rate for each pixel, and then converted into a digital signal (luminance data) by the AD conversion section 52.

Figure 11:
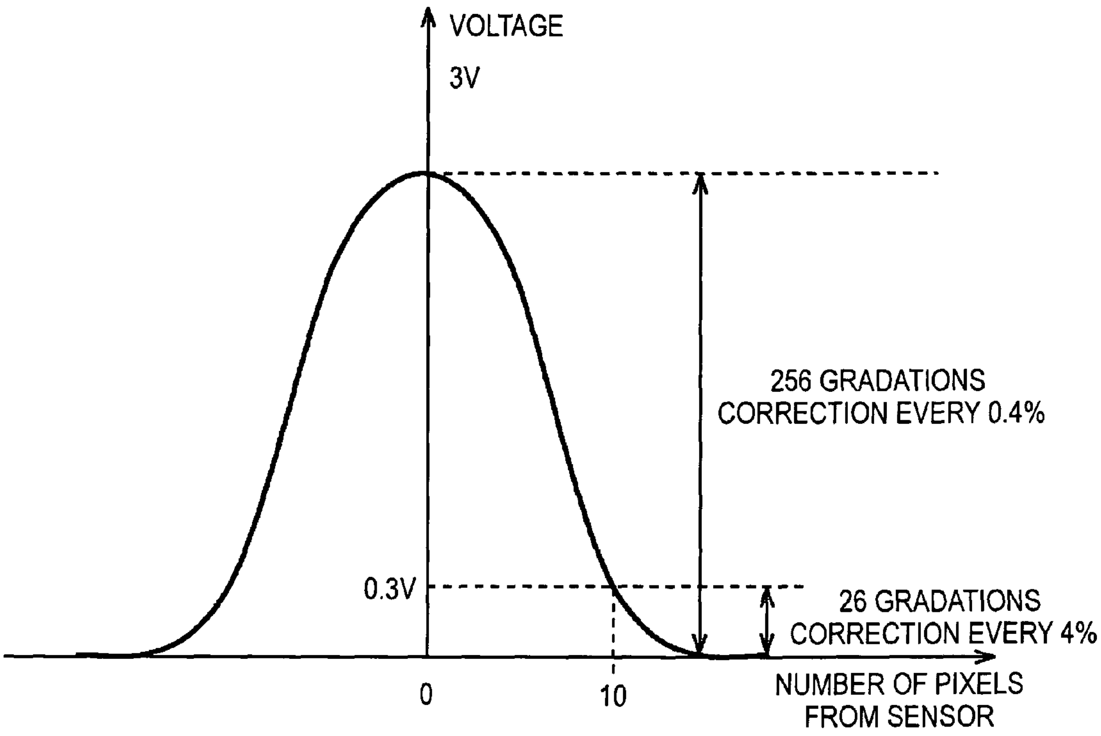
FIG. 11 is a diagram showing the relationship between a sensor output voltage and correction accuracy.

FIG. 11 shows the sensor output voltage of the light-receiving sensor 3 after being amplified by the amplification section 51. The horizontal axis and the vertical axis in FIG. 11 are the same as those in FIGS. 10A and 10B. That is, the horizontal axis represents the distance (the unit is the number of pixels) in the horizontal or vertical direction from the light-receiving sensor 3 to the measurement-target pixel 101, and the vertical axis represents the sensor output voltage after amplification. Note that the unit of the vertical axis is V.

In the example of FIG. 11, when a pixel 101 which is disposed away from the light-receiving sensor 3 by zero pixel, that is, a pixel 101 immediately below the light-receiving sensor 3 emits light with predetermined light-emission luminance, the amplification section 51 outputs a voltage of 3 V. Meanwhile, when a pixel 101, which is disposed away from the light-receiving sensor 3 by ten pixels, emits light with predetermined light-emission luminance (with the same light-emission luminance), the amplification section 51 outputs a voltage of 0.3 V.

Note here that it is assumed that the AD conversion section 52 converts the analog light-reception signal into 8-bit (256 gradation) luminance data. That is, 256 gradations are allocated to 3 V which is the maximum value of the voltage (the amplified analog light-reception signal) output from the amplification section 51. In this case, with regard to the pixel 101 where the output voltage of 3 V is obtained, the output voltage per gradation becomes 3 V/256=about 0.0117 V, and thus correction can be carried out for every (0.0117/3)×100=about 0.4%. Meanwhile, with regard to the pixel 101 where the maximum output voltage of no more than 0.3 V is obtained, correction is carried out for every (0.0117/0.3)×100=about 4%. That is, there is a problem in that, with regard to the pixel 101 farther away from the light-receiving sensor 3, the resolution of correction increases, and the correction accuracy is degraded. Further, when the light-reception amount is small, it takes a lot of time for the light-receiving sensor 3 to receive light, so it takes a lot of time to carry out the entire correction operation. As a result, with regard to the pixel 101 where the light-reception amount is small, sufficient burn-in correction may not be carried out. When the light-receiving sensors 3 are disposed on the rear surface of the EL panel 2, the light-receiving sensors 3 are disposed on the surface opposite to the light-emitting surface, so the light-reception amount on the rear surface is smaller than that on the front surface. In addition, the pixel 101 disposed far away from the light-receiving sensor 3 has a much smaller light-reception amount, causing the above-described problem, so sufficient burn-in correction may not be carried out.

In order to solve this problem, the display 1 of FIG. 1 is configured such that even a pixel 101 far away from the light-receiving sensor 3 can obtain a sufficient light-reception amount.

First, for ease of understanding the difference between the display 1 of FIG. 1 and the known display, the arrangement of the known display will be described. In the known display, as described below, the way to attach the light-receiving sensors 3 to the EL panel 2 is different from that of the display 1, but the EL panel 2 and the light-receiving sensor 3 themselves are the same as those in the display 1. Thus, the known display will be described in connection with the EL panel 2 and the light-receiving sensors 3.

[Known Arrangement of Light-Receiving Sensor 3]

Figure 12:
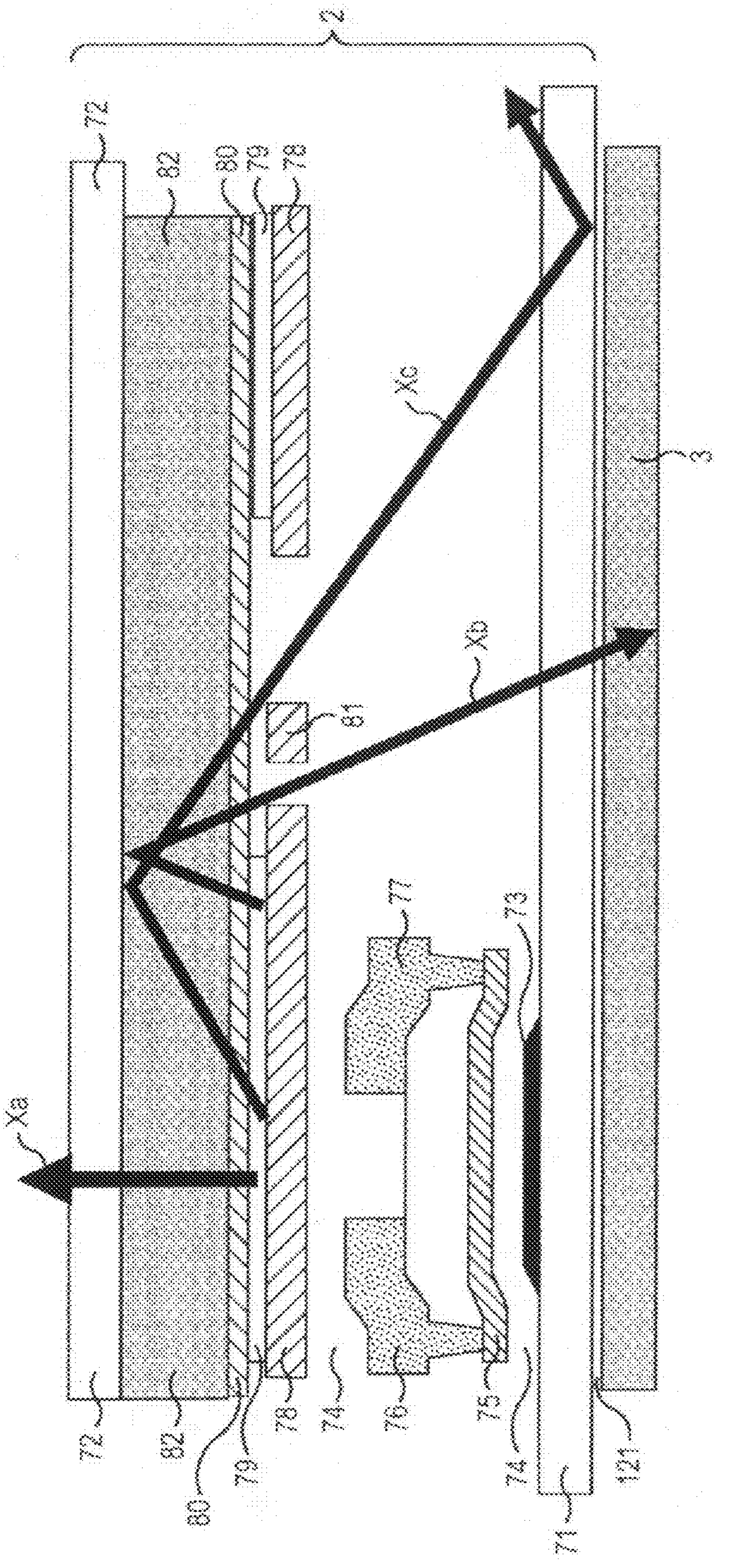
FIG.12 PRIOR ART
FIG. 12 is a sectional view showing the arrangement of an EL panel and a light-receiving sensor in a known display.

FIG. 12 is a sectional view showing the arrangement of the EL panel 2 and the light-receiving sensors 3 in the known display.

The EL panel 2 includes a support substrate 71, on which thin film transistors are formed, and a counter substrate 72 opposite the support substrate 71 with a light-emitting layer interposed therebetween. In this embodiment, the support substrate 71 and the counter substrate 72 are made of glass, but the invention is not limited thereto.

A gate electrode 73 of the drive transistor 32 is formed on the support substrate 71. A polysilicon film 75 is formed on the gate electrode 73 with an insulating film 74 interposed therebetween so as to form a channel region. A source electrode 76 and a drain electrode 77 are formed on the polysilicon film 75. The polysilicon film 75, the source electrode 76, and the drain electrode 77 are covered with the insulating film 74. The insulating film 74 is made of a transparent material which transmits lights.

An anode electrode 78 is formed on a surface, which is planarized by the insulating film 74, above the polysilicon film 75, the source electrode 76, and the drain electrode 77.

An organic EL layer 79 which is a light-emitting layer emitting light of a predetermined color of red, green, or blue is formed on the anode electrode 78. A cathode electrode 80 is formed on the organic EL layer 79. As shown in FIG. 12, the cathode electrode 80 is formed in the shape of a film uniformly over the entire surface, and the anode electrode 78 and the organic EL layer 79 are formed separately for each pixel 101. An auxiliary line 81 is formed of the same metal film as the anode electrode 78 between adjacent anode electrodes 78. The auxiliary line 81 is provided so as to decrease the resistance value of the cathode electrode 80, and connected to the cathode electrode 80 at a point (not shown). The cathode electrode 80 is formed to be thin enough to transmit light from the organic EL layer 79 toward the top surface. This causes an increase in the resistance value of the cathode electrode 80. If resistance is high, the cathode potential Vcat of the light-emitting device 34 may vary, which may affect image quality. Thus, the auxiliary line 81 is formed of the same metal film as the anode electrode 78, and connected to the cathode electrode 80, such that the resistance value of the cathode electrode 80 decreases. The gap between the cathode electrode 80, which is formed in the shape of a uniform film over the entire surface, and the counter substrate 72 is sealed by a sealant 82.

The EL panel 2 is configured as above. The light-receiving sensors 3 are disposed on the surface opposite to the surface of the support substrate 71, on which the gate electrode 73 is formed, that is, the rear surface of the EL panel 2. Note that the light-receiving sensors 3 are disposed below (on the rear side of) the support substrate 71, for example, by fixing a printed board (printed wiring board) having mounted thereon the light-receiving sensors 3 to the peripheral portion (outer edge) of the EL panel 2. Therefore, as shown in FIG. 12, the support substrate 71 and the light-receiving sensor 3 are not closely adhered to each other, and a slight air layer 121 exists between the support substrate 71 and the light-receiving sensor 3.

In the display, light emitted from the organic EL layer 79 toward the display surface of the EL panel 2 is viewed as video by the user, as indicated by an optical path Xa in FIG. 12. The light-receiving sensor 3 receives light emitted from the organic EL layer 79, reflected by the counter substrate 72, and input to the rear side of the EL panel 2, as indicated by optical paths Xb and Xc. The optical path Xb is the path of light which is input to the light-receiving sensor 3 at an angle nearly perpendicular to the light-receiving sensor 3 (small incident angle), and the optical path Xc is the path of light which is input to the light-receiving sensor 3 at an angle nearly parallel to the light-receiving sensor 3 (large incident angle).

Light passing through the optical path Xb is input to the light-receiving sensor 3 as it is. Meanwhile, light passing through the optical path Xc is reflected by the interface of glass and the air layer 121, and is not input to the light-receiving sensor 3 since the refractive index of glass forming the support substrate 71 is larger than the refractive index of the atmosphere (air). In other words, whether or not the light-receiving sensor 3 can receive the light reflected from the counter substrate 72 and input to the rear side of the EL panel 2 depends on the incident angle.

Among pixels 101 in a predetermined region which is covered by one light-receiving sensor 3, with regard to a pixel 101 near the light-receiving sensor 3 and a pixel 101 far away from the light-receiving sensor 3, the incident angles of light received by the light-receiving sensor 3 will be compared with each other. The light-receiving sensor 3 receives, from the pixel 101 near the light-receiving sensor 3, a large amount of light input at an angle nearly perpendicular to the light-receiving sensor 3 (small incident angle), as indicated by the optical path Xb. Meanwhile, the light-receiving sensor 3 receives, from the pixel 101 far away from the light-receiving sensor 3, light input at an angle nearly parallel to the light-receiving sensor 3 (large incident angle), as indicated by the optical path Xc. Thus, in the case of the pixel 101 faraway from the light-receiving sensor 3, the light-reception amount is small depending on the distance, and light that should be received is reflected. As a result, the light-reception amount may become smaller.

Description will be provided for the arrangement of the display 1 which is configured such that, for the pixel 101 far away from the light-receiving sensor 3, the sensor output voltage (corresponding to the light-reception amount) of the light-receiving sensor 3 increases.

[Arrangement of Light-Receiving Sensor 3 in Display 1]

Figure 13:
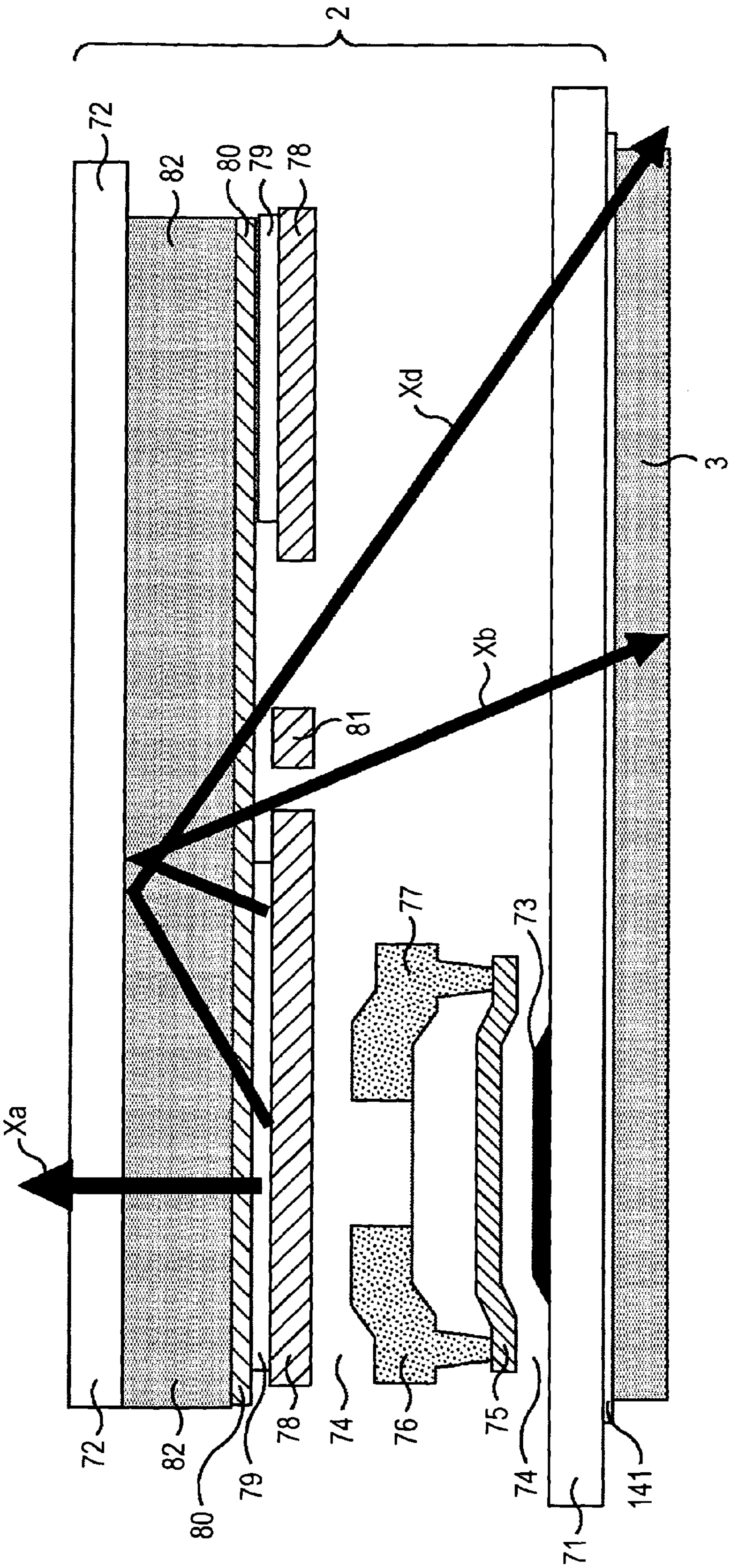
FIG. 13 is a sectional view showing the arrangement of an EL panel and a light-receiving sensor in a display of FIG. 1.

FIG. 13 is a sectional view showing the arrangement of the EL panel 2 and the light-receiving sensors 3 in the display 1.

In FIG. 13, the portions corresponding to FIG. 12 are represented by the same reference numerals, and descriptions thereof will be omitted.

The configuration of FIG. 13 is different from the configuration of FIG. 12 in that the light-receiving sensors 3 are adhered to the surface opposite to the surface of the support substrate 71 on which the gate electrode 73 is formed, by an adhesive layer (adhesive) 141.

The adhesive layer (adhesive) 141 is formed of a material with a refractive index which is equal to or smaller than that of the material (glass) of the support substrate 71. Therefore, as indicated by an optical path Xd, light emitted from the organic EL layer 79 and reflected by the counter substrate 72 goes straight and is input to the light-receiving sensor 3. That is, the light-receiving sensor 3 can receive light which is input at an angle nearly parallel to the light-receiving sensor 3.

The light-receiving sensor 3 can receive light which is input at an angle nearly parallel to the light-receiving sensor 3, so the light-reception amount from the pixel 101 far away from the light-receiving sensor 3 can be increased. The increase in the light-reception amount from the pixel 101 far away from the light-receiving sensor 3 contributes to the settlement of the problem described with reference to FIG. 11. That is, the correction accuracy for the pixel 101 far away from the light-receiving sensor 3 can be improved, and it can take less time for the light-receiving sensor 3 to receive light.

[Effects of Display 1]

Figure 14B:
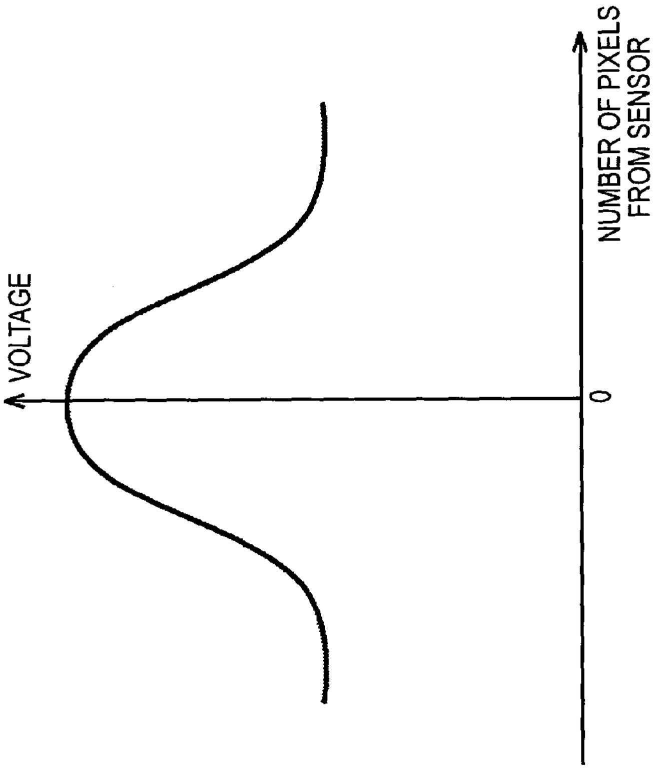
FIGS. 14A and 14B are diagrams showing the comparison result of the effects of the related art and the invention.
Figure 14A:
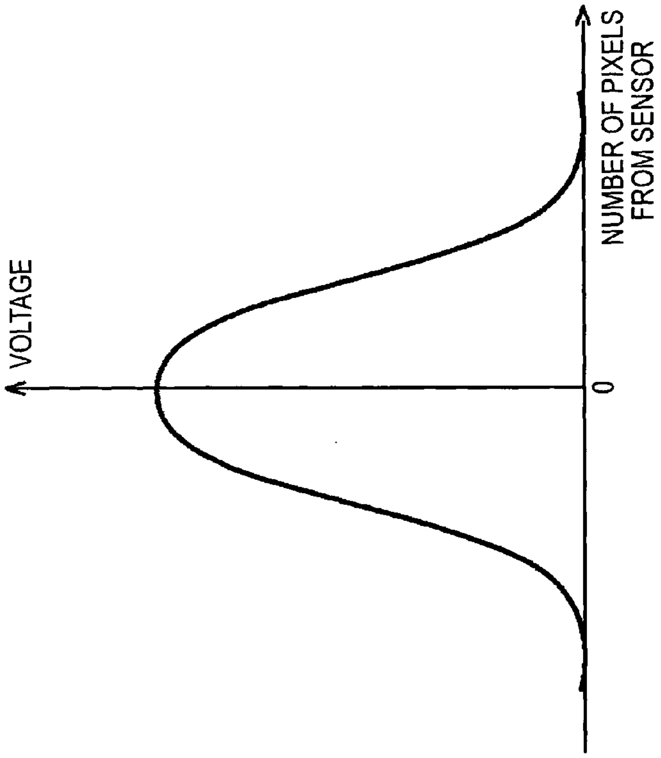

FIGS. 14A and 14B are diagrams showing the comparison result of the effects of the known arrangement shown in FIG. 12 and the arrangement of the display 1 shown in FIG. 13.

FIG. 14A shows the relationship between the distance to the light-receiving sensor 3 and the sensor output voltage in the known arrangement of FIG. 12. That is, FIG. 14A shows the same light-reception characteristic as FIGS. 10A and 10B or FIG. 11.

FIG. 14B shows the relationship between the distance to the light-receiving sensor 3 and the sensor output voltage in the arrangement of the display 1 of FIG. 13. When the arrangement of the display 1 is used, as shown in FIG. 14B, the (voltage corresponding to) light-reception amount from the pixel 101 near the light-receiving sensor 3 also increases, and the light-reception amount from the pixel 101 faraway from the light-receiving sensor 3 can further increase. As a result, a variation in the light-reception amount between the measurement-target pixels 101 of the light-receiving sensor 3 can be suppressed. That is, the light-reception amounts from the respective pixels 101 in a region covered by the light-receiving sensor 3 can be made to be uniform.

As described above, according to the arrangement of the display 1 of FIG. 13, in the burn-in correction control for suppressing the burn-in phenomenon, it is possible to solve the problem due to the small light-reception amount of the pixel 101 far away from the light-receiving sensor 3. That is, high-speed and accurate burn-in correction can be performed.

Note that the difference in the light-reception luminance which depends on the distance from the light-receiving sensor 3 may be suppressed by adjusting the duty ratio of the light-emission period or the signal potential Vsig. The arrangement of the display 1 shown in FIG. 13 may use along with another method that suppresses the distance-dependent difference in the light-reception luminance. The duty ratio of the light-emission period or the signal potential Vsig may be adjusted with the light-reception amount of the farthest pixel 101 as a reference. Therefore, if the light-reception luminance of the farthest pixel 101 increases, the overall light-reception luminance increases and the light-reception time can be reduced.

MODIFICATIONS

The invention is not limited to the foregoing embodiment, and various modifications may be made without departing from the spirit and scope of the invention.

A dummy pixel may be provided outside the effective pixel region in the pixel array section 102 so as to detect light-emission luminance. Similarly, a light-receiving sensor 3 which measures the light-emission luminance of the dummy pixel can be adhered to the support substrate 71 by the adhesive layer 141 with a refractive index which is equal to or smaller than the refractive index of the material of the support substrate 71. When the light-emission luminance of the dummy pixel is measured, there is no problem involving visibility, so the light-receiving sensor 3 may be disposed on the front surface (display surface) of the EL panel 2. In this case, the light-receiving sensor 3 is disposed on the surface opposite to the surface of the counter substrate 72 which faces the sealant 82. The counter substrate 72 and the light-receiving sensor 3 are adhered to each other by the adhesive layer (adhesive) 141 with a refractive index which is equal to or smaller than the refractive index of the counter substrate 72. Therefore, the light-receiving sensor 3 may be disposed on the front surface of the EL panel 2 as well as the rear surface of the EL panel 2. That is, the light-receiving sensor 3 may be adhered to the outermost substrate (the support substrate 71 or the counter substrate 72) constituting the EL panel 2 by using a material with a refractive index which is equal to or smaller than the refractive index of the outermost substrate.

As described with reference to FIG. 4, the pixel 101 includes two transistors (the sampling transistor 31 and the drive transistor 32) and one capacitor (the storage capacitor 33), but the pixel 101 may have other circuit configuration.

As another circuit configuration of the pixel 101, in addition to the configuration (hereinafter, also referred to as 2Tr/1C pixel circuit) where the two transistors and one capacitor are provided, the following circuit configuration may be used. That is, a configuration (hereinafter, also referred to as 5Tr/1C pixel circuit) may be used in which five transistors including first to third transistors and one capacitor are provided. In the pixel 101 using the 5Tr/1C pixel circuit, the signal potential which is supplied from the horizontal selector 103 to the sampling transistor 31 through the video signal line DTL10 is fixed at Vsig. As a result, the sampling transistor 31 only functions to switch the supply of the signal potential Vsig to the drive transistor 32. Further, the potential which is supplied to the drive transistor 32 through the power supply line DSL10 is fixed at the first potential Vcc. The first transistor added switches the supply of the first potential Vcc to the drive transistor 32. The second transistor switches the supply of the second potential Vss to the drive transistor 32. The third transistor switches the supply of the reference potential Vofs to the drive transistor 32.

As another circuit configuration of the pixel 101, an intermediate circuit configuration between the 2Tr/IC pixel circuit and the 5Tr/1C pixel circuit may be used. That is, a configuration (hereinafter, referred to as 4Tr/1C pixel circuit) may be used in which four transistors and one capacitor are provided, or a configuration (hereinafter, referred to as 3Tr/1C pixel circuit) may be used in which three transistors and one capacitor are provided. For example, the signal potential which is supplied from the horizontal selector 103 to the sampling transistor 31 may be pulsed between Vsig and Vofs. Therefore, the third transistor or the second and third transistors may be omitted, so the 4Tr/1C pixel circuit or the 3Tr/1C pixel circuit may be implemented.

In the 2Tr/1C pixel circuit, the 3Tr/1C pixel circuit, the 4Tr/1C pixel circuit, or the 5Tr/1C pixel circuit, an auxiliary capacitor may be further provided between the anode and the cathode of the light-emitting device 34 so as to compensate for the capacitive component of the organic light-emitting material portion.

Although in the foregoing embodiment, an example where a self-luminous panel (EL panel) using an organic EL device is used has been described, the invention may be applied to other self-luminous panels, such as an FED (Field Emission Display) and the like.

In this specification, the steps described in the flowcharts may not necessarily be executed in time series in accordance with the order described in the flowcharts, and may be executed in parallel or individually.

APPLICATIONS OF THE INVENTION

The display 1 of FIG. 1 can be assembled into various electronic apparatuses as a display unit. Examples of the electronic apparatuses include, for examples, a digital still camera, digital video camera, a notebook-type personal computer, a mobile phone, a television receiver, and the like. Hereinafter, examples of an electronic apparatus to which the display 1 of FIG. 1 is applied will be described.

The invention may be applied to a television receiver which is an example of an electronic apparatus. The television receiver includes a video display screen having a front panel, a filter glass, and the like. The television receiver is manufactured by using the display according to the embodiment of the invention for the video display screen.

The invention may also be applied to a notebook-type personal computer which is an example of an electronic apparatus. The notebook-type personal computer includes a keyboard which is provided in the main body and is operated when the user inputs characters or the like, and a display unit which is provided in a main body cover so as to display an image. The notebook-type personal computer is manufacturing by using the display according to the embodiment of the invention for the display unit.

The invention may also be applied to a portable terminal which is an example of an electronic apparatus. The portable terminal has an upper casing and a lower casing. The portable terminal is switched between a state where the two casings are unfolded and a state where the two casings are folded. The portable terminal includes, in addition to the upper casing and the lower casing, a connection portion (in this case, a hinge), a display, a sub display, a picture light, a camera, and the like.

The portable terminal is manufactured by using the display according to the embodiment of the invention for the display or the sub display.

For example, the invention may be applied to a digital video camera which is an example of an electronic apparatus. The digital video camera includes a main body portion, a lens for photographing a subject at the forward side surface, a photographing start/stop switch, a monitor, and the like. The digital video camera is manufactured by using the display according to the embodiment of the invention for the monitor.

The present application contains subject matter related to that disclosed in Japanese Priority Patent Application JP 2008-320562 filed in the Japan Patent Office on Dec. 17, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display comprising:

a display assembly extending along and about an x-axis, a y-axis and a z-axis with respective ones of the axes intersecting at a common point and oriented perpendicularly relative to each other to form a conventional Cartesian coordinate system with the x-axis and the y-axis defining an x-y plane, the display assembly including:

a panel extending in the x-y plane and having a matrix of pixels located in a region and emitting light therefrom in response to a video signal;

a light-receiving sensor disposed apart from the panel in a z-direction yet oriented generally centrally among the matrix of pixels as viewed along the z-axis and onto the x-y plane with at least one pixel being located farthest from the light-receiving sensor relative to remaining ones of the matrix of pixels, the light-receiving sensor receiving light in sequence from each individual one of the at least one pixel located farthest from the light-receiving sensor and the remaining ones of the matrix of pixels in the region and outputting light-reception signals in accordance with light-emission from each individual one of the at least one pixel located farthest from the light-receiving sensor and the remaining ones of the matrix of pixels;

calculation means for calculating correction data on the basis of the light-reception signals from the at least one pixel located farthest from the light-receiving sensor and the remaining ones of the matrix of pixels; and drive control means for correcting the video signal on the basis of the correction data.

2. The display according to claim 1, wherein the video signal is adjusted with a light-reception amount of the at least one pixel located farthest from the light-receiving sensor as a reference.

3. The display according to claim 1, wherein a duty ratio of a light-emission period is adjusted with a light-reception amount of the at least one pixel located farthest from the light-receiving sensor as a reference.

4. The display according to claim 1, wherein the light-receiving sensor has a light-receiving sensor surface; and wherein the light-receiving sensor is adhered to an outermost substrate constituting the panel by using an adhesive material with a refractive index which is equal to or smaller than that of the substrate and greater than that of air, the adhesive material sandwiched between the light-receiving sensor and the outermost substrate with the adhesive material being in contact with the entirety of both the light-receiving sensor surface and a portion of the outermost substrate facially opposed to the light-receiving sensor surface.

5. The display according to claim 1, wherein the at least one pixel located farthest from the light-receiving sensor is approximately ten pixel lengths away from the light-receiving sensor as viewed in the x-y plane.

* * * * *